Figure 1:
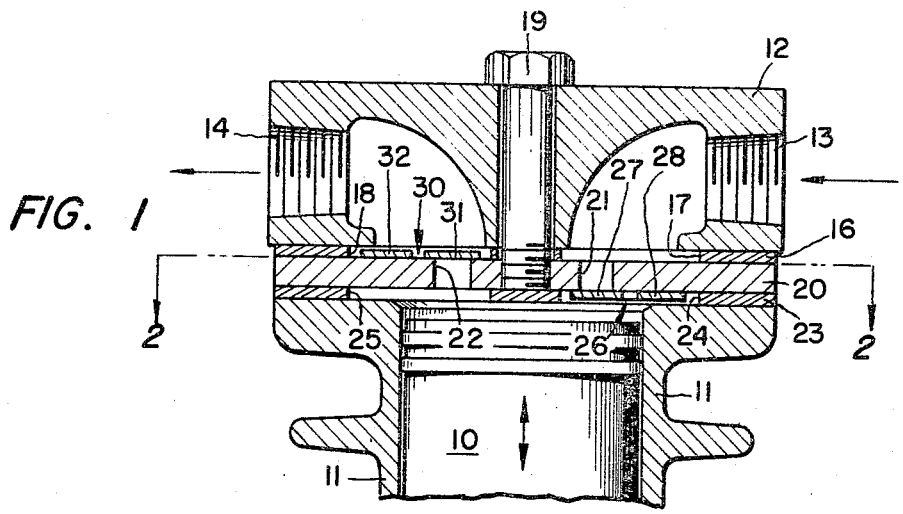

May 16, 1967 A. E. BROWN 3,319,879
VALVE MECHANISM
Filed Oct. 31, 1963

INVENTOR.
ARTHUR E. BROWN
BY
Charles J. Worth
AGENT

United States Patent Office 3,319,879
Patented May 16, 1967

---

3,319,879
VALVE MECHANISM
Arthur E. Brown, Corning, N.Y., assignor to Ingersoll-Rand Company, New York, N.Y., a corporation of New Jersey
Filed Oct. 31, 1963, Ser. No. 320,362
4 Claims. (Cl. 230—231)

This invention relates to valves and more particularly to a valve utilizing a reed or flexible finger member cooperating with an orifice in a valve plate to limit flow to only one direction through the valve.

This general class of valves is not new and presently utilizes a thin elongated flexible strip of flexible material, connected at one end to an orifice or valve plate, as the reed or flexible finger member. The orifice may be circular or an elongated slot that is normally closed by the reed. Flow forces acting on the reed through the orifice causes the reed to flex away from the plate to permit flow through the valve. Reverse flow forces more firmly seats the reed on the valve plate sealing the orifice to prevent flow through the valve. When the reed is flexed to open the valve, flow through the orifice is more restricted adjacent the connected reed end. It should be realized that the closure portion of the reed flexes and is therefore subject to distortion.

Accordingly, an object of the present invention is to provide a valve having a reed member for limiting flow to only one direction through an orifice wherein the reed moves substantially an equal distance away from all portions of the orifice to reduce restriction to flow.

Another object of the present invention is to provide the foregoing valve in which one portion of the reed is to provide flexibility and another portion is to provide closure or flow control.

And, another object of the present invention is to provide a valve having a plurality of orifices and a plurality of reed members, each in accordance with the foregoing for controlling flow through one of the orifices.

Still another object of this invention is a piston and cylinder with valves controlling inlet and outlet flow comprising a pair of reed members connected to opposite sides of a single valve plate disposed between the head end of the cylinder and the cylinder head; the flat end surfaces of the cylinder and head each providing a stop to limit the flexing of one of the reed members.

The present invention contemplates a valve comprising a valve plate having a port for flow therethrough, and a reed member having a pair of finger portions connected to one another at one end of the member, one of the finger portions overlying the port to block flow therethrough and being movable away from the valve plate to permit such flow, and the other of the finger portions being connected to the plate at its end opposite from the end connecting the finger portions to each other and being flexible for permitting the finger portion overlying the port to move away from the plate in response to forces acting on the reed member through the orifice.

The foregoing and other objects and advantages will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

Figure 3:
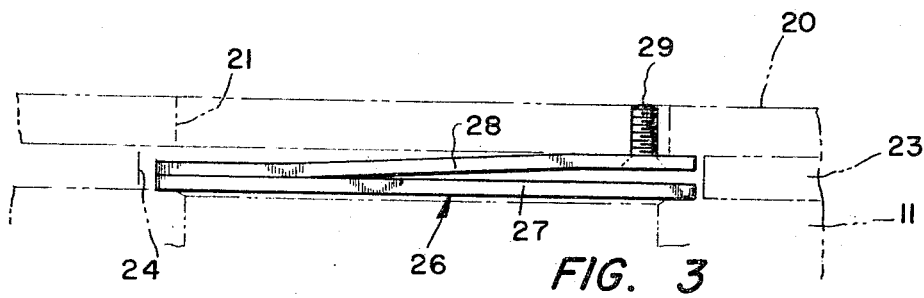
Figure 2:
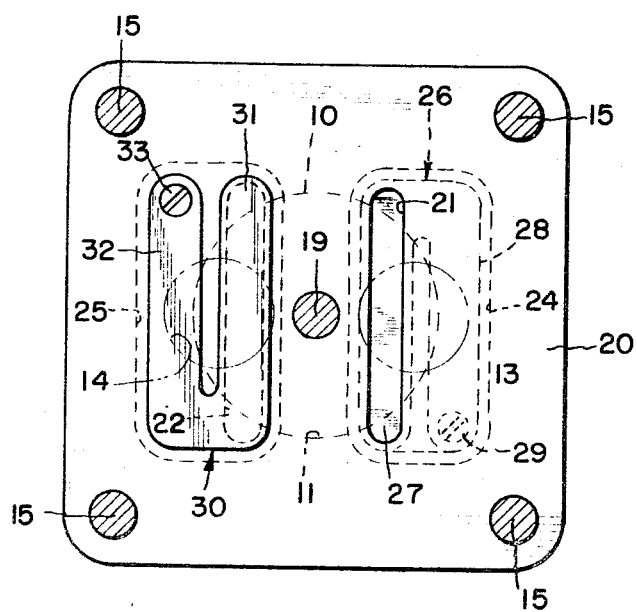

FIGURE 1 is a sectional view through the head end of a cylinder embodying a valve made in accordance with the present invention, FIGURE 2 is a sectional view taken on line 2—2 of FIGURE 1 illustrating the novel valve in plan, and FIGURE 3 is an enlarged elevational view of one of the reed or flexible finger members of the novel valve of FIGURES 1 and 2.

The present invention is particularly adapted to cylinders of compressors and will be described in such environment. It shall be understood, that this is to facilitate description only and there is no intent to define the limits thereby.

Referring now to the drawings a piston 10 is reciprocal in a cylinder or the chamber of a cylinder casing 11 having a head or head casing 12, with an inlet 13 and an outlet 14, connected thereto by bolts 15. As piston 10 moves away from head 12, fluid, in this instance air, is drawn into cylinder 11 through inlet 13. Movement of piston 10 toward head 12 compresses fluid (air) in cylinder 11 which is discharged through outlet 14. To prevent flow reversal in the inlet 13 and outlet 14, valve means is required between cylinder 11 and head 12.

To this end, a valve plate 20, having a pair of ports in the form of slots 21 and 22 spaced from one another, is connected to head 12 by a bolt 19. A spacer/seal 16 is provided between plate 20 and head 12, and has a pair of spaced openings 17 and 18, respectively.

Thus, openings 17 and 24 with slot 21 therebetween provide a flow path or connection between the inlet 13 and the cylinder 11 while a similar flow path or connection for outlet 14 is formed by openings 18 and 25 with slot 22 therebetween to control flow in these flow paths, a pair of reed or flexible finger members 26 and 30 are disposed in openings 24 and 18, respectively, and are connected to plate 20.

A slot divides reed or flexible finger member 26 into two portions 27 and 28. A screw 29, or the like, is provided to connect one end of portion 28, which acts as a spring, to the cylinder side of plate 20. The other end of spring portion 28 is connected to or integral with the adjacent end of portion 27 which overlies and provides a cover for slot 21. Reed or flexible finger member 30 is similar to member 26, having a spring portion 32 connected at one end to the head side of plate 20 by a screw 33 and connected to or integral with, at its other end, to a portion 31 which overlays and provides a closure for slot 22.

When piston 10 is at rest, spring portion 28 maintains or biases closure portion 26 to seat on the cylinder side of plate 20 and block flow through slot 21 between cylinder 11 and inlet 13. Similarly spring portion 32 maintains or biases closure portion 31 to seat on the head side of plate 20 and block flow through slot 22 between cylinder 11 and outlet 14.

When the compressor is in operation, movement of piston 10 away from head 12 creates a pressure difference across plate 20 with resulting forces in inlet 13 being greater than in cylinder 11. Thus, pressure or the resulting forces in inlet 13 will act on reed 26 through slot 21 urging closure member 27 to move away from plate 20 and to flex spring portion 28. Simultaneously, the reduced pressure in cylinder 11 will create forces which will act to further seat closure portion 31 on the head side of plate 20 to insure sealing of slot 22 to block flow between cylinder 11 and inlet 14.

At the end of the intake stroke of piston 10 or its movement way from head 12, piston 10 starts its compression stroke or moves toward head 12 compressing air in cylinder 11 resulting in higher pressures in cylinder 11 than in inlet 13 and outlet 14. At this time, pressure or forces acting on reed 30 through slot 22 moves closure portion 31 away from plate 20, flexing spring portion 32 and opening slot 22 to discharge flow of compressed air from cylinder 11 to outlet 14. Simultaneously forces acting on reed 26 will further seat closure portion 27 on plate 20 to seal slot 21 from flow reversal therethrough.

It should be realized that opening pressure or forces acting on reed 26 or 30 will cause spring portion 28 or 32 to flex, and to some extent will cause closure portion 27 or 31 also to flex. Where desired, flexure may be limited to spring portion 28 or 32 by heat treatment of reed 26 or 30, or by other well known rigidizing means. As shown in FIGURES 2 and 3, part of the flat end surface of cylinder 11 spaced from plate 20 by spacer/seal 23 overlaps the ends of and acts as a stop to limit displacement of closure portion 27 of reed 26. Similarly, part of the flat surface of cylinder head 12 spaced from plate 20 by spacer/seal 16 acts as a stop to limit displacement of closure portion 31 of reed 30. Thus, additional valve stop plates are not required.

Although not shown to provide flow control in conduits, a separate valve incorporating valve plate 20 and reeds 26 and 30 may be made within the concepts of the present invention. In such an arrangement, cylinder head 12 would take the form of one portion of the valve housing while cylinder 11 would provide the balance of the valve housing having either a single flow path or two separate flow paths similar to head 12, according to the requirements of the system in which it will be installed. It also should be realized that one half of plate 20 with one slot 21 or 22 and the associated reed 26 or 30 may be embodied in an arrangement requiring only a single controlled or unidirectional flow path.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

I claim:
1. A valve comprising:
   a valve plate disposed across a flow path having a port for allowing fluid to pass therethrough;
   flow control means including a flat flexible plate mounted on said valve plate and having a slot open at one end to provide a pair of elongated fingers connected to each other at the end of the flat plate opposite from the open end of said slot;
   one of said fingers being normally seated against said valve plate overlying said port to provide a flow blocking closure;
   the other of said fingers being secured to said valve plate at a point adjacent the open end of said slot; and
   said closure finger being movable substantially away from said plate for opening said port to allow fluid to pass therethrough.

2. In combination with a cylinder having a piston mounted for reciprocal movement therein and a cylinder head having an inlet passage and an outlet pasage, valve means comprising:
   a valve plate fixedly mounted between the cylinder and a cylinder head and having a pair of spaced ports therethrough each aligned with one of the passages in the cylinder head;
   first means mounted on one side of said valve plate for limiting the flow of fluid through one of said passages to one direction;
   second means mounted on the other side of said valve plate for limiting the flow of fluid through the other of said passages to the opposite direction;
   each flow limiting means including a flat flexible plate having a slot open at one end to provide a pair of elongated fingers connected to each other at the end of the flat plate opposite from the open end of said slot;
   one of said fingers being normally seated against said valve plate overlying one of said ports to provide a flow blocking closure;
   the other of said fingers being secured to said valve plate at a point adjacent the open end of said slot; and
   said closure finger being movable substantially away from said plate for opening one of said ports to allow fluid to pass therethrough.

3. The apparatus of claim 2 further including seal means on each side of said valve plate for spacing the valve plate and cylinder and the valve plate and cylinder head.

4. The apparatus of claim 3 wherein the end surfaces of the cylinder and cylinder head overlie the ends of the flow limiting means disposed on the side of the plate adjacent thereto to provide a stop for limiting the movement of the closure finger of said flow limiting means away from the valve plate.

References Cited by the Examiner

UNITED STATES PATENTS

| | | | |
|---|---|---|---|
| 756,869 | 4/1904 | Mansfield | 137—525.3 |
| 1,634,247 | 6/1927 | Blom | 137—525.3 |
| 2,043,849 | 6/1936 | Bixler | 137—525.3 |
| 2,908,287 | 10/1959 | Augustin | 137—512 X |

WILLIAM F. O'DEA, *Primary Examiner.*

DAVID J. ZOBKIW, *Assistant Examiner.*